US006228451B1

(12) United States Patent
Boudouris et al.

(10) Patent No.: US 6,228,451 B1
(45) Date of Patent: May 8, 2001

(54) CARD HAVING ADHESIVE LAYER AND METHOD OF MANUFACTURING SAME

(75) Inventors: Randall A. Boudouris; Robert E. Napierala, II, both of Sylvania, OH (US)

(73) Assignee: True Label, Inc., Toledo, OH (US)

( * ) Notice: Subject to any disclaimer, the term of this patent is extended or adjusted under 35 U.S.C. 154(b) by 0 days.

(21) Appl. No.: 09/103,040

(22) Filed: Jun. 23, 1998

(51) Int. Cl.[7] .......................... B32B 3/10

(52) U.S. Cl. .......................... 428/40.1; 40/299; 283/81; 428/41.7; 428/41.8; 428/41.9; 428/42.1; 428/42.2; 428/43

(58) Field of Search .......................... 428/40.1, 41.7, 428/41.8, 41.9, 42.1, 42.2, 43; 40/299; 283/81

(56) References Cited

U.S. PATENT DOCUMENTS 4,188,427 * 2/1980 Grass .......................... 428/42.2
5,458,282 10/1995 Martin .......................... 229/92.8

* cited by examiner

*Primary Examiner*—Nasser Ahmad

(74) *Attorney, Agent, or Firm*—MacMillan, Sobanski & Todd, LLC

(57) ABSTRACT

A card having an adhesive layer for allowing the card to be removably attached to any desired structure. In one embodiment of the invention, the adhesive layer is applied to one of the surfaces of the card and a layer of liner material is disposed over the adhesive layer. Peeling off a portion of the liner material exposes a portion of the adhesive layer. The card can be removably attach to the desired structure by pressing the exposed adhesive layer against the structure. In another embodiment of the invention, the card has a pressure sensitive label portion and a coupon portion. The label portion includes a layer of adhesive between a layer of sheet material and a layer of liner material. Peeling off a portion of the liner material exposes a portion of the adhesive layer. The card is removably attach to the desired structure by pressing the exposed adhesive layer against the structure. In both embodiments, a permanent adhesive layer may be disposed over the layer of liner material and a second layer of liner material may be disposed over the permanent adhesive layer. Peeling off the second layer of liner material exposes a portion of permanent adhesive layer. The card can be fixedly attached to the structure by pressing the exposed permanent adhesive layer against the structure. Also, a variety of indicia, such as coupon and advertising indicia, can be printed on the card. A method of manufacturing the card is also described.

24 Claims, 4 Drawing Sheets

CARD HAVING ADHESIVE LAYER AND METHOD OF MANUFACTURING SAME

BACKGROUND OF THE INVENTION

This invention relates in general to cards, and in particular, to advertising cards having an adhesive layer for removably attaching the card to a structure and a method of manufacturing the same.

It is well known that consumer wastes time going through a drawer or folder in order to find a card, for example, a coupon card, only to find that the coupons on the card are expired. A solution is to provide a card that can be attached to a surface so that the card can be displayed in front of the consumer so that the consumer can readily access the card.

Up to now, there a few examples of such cards exist. One example, U.S. Pat. No. 5,458,282 to Martin, discloses a card having a magnetic sheet secured to one surface of the card. The card includes a section of the card having a layer of material containing the magnetic particles can be secured to a metal object for displaying the card. The section of the card with the layer of magnetic particles can be separated from the rest of the card to attach other sheets of paper to the magnetic surface. However, the card can only be attached to a metallic surface, and cannot be attached, for example, to a window, a wooden surface, a plastic surface, or any other non-metallic surface. Further, the section of the card with the magnetic particles increases the cost and complicates the manufacturing of the card. Thus, it would be desirable to provide a card that can be removably attached to any desired surface and is relatively cost-effective and less complicated to manufacture.

SUMMARY OF THE INVENTION

This invention relates to a card having an layer of adhesive material that allows for the card to be removably attached to any desired structure. In a first embodiment of the invention, the card includes a blank or coupon portion. The blank has an upper or top surface and a lower or bottom surface. The blank has at least one line of perforations dividing the blank into a top section and a bottom section. A layer of adhesive material is disposed over at least a portion of the bottom surface within the top section. A layer of liner material is disposed over the layer of adhesive material. A portion of the layer of adhesive material is exposed by removing at least a portion of the layer of liner material. The card can be removably attached to any desired structure by pressing the exposed layer of adhesive material against the structure.

In a second embodiment of the invention, the card includes a blank portion and a label portion. The blank portion has an upper or top surface and a lower or bottom surface. The label portion includes a layer of sheet material, a layer of liner material, and a layer of adhesive material disposed between the layer of sheet material and the layer of liner material. Either the layer of sheet material or the layer of liner material has a length or a width less than the layer of adhesive material to expose at least a portion of the layer of adhesive material. The label portion can be removably attached to the blank portion by pressing the exposed portion of the layer of adhesive material against the blank portion.

In both embodiments, the card may include a layer of permanent adhesive material disposed over the layer of liner material and a second layer of liner material disposed over the layer of permanent adhesive material. The card can be fixedly attached to any desired structure by removing at least a portion of the second layer of liner material from the layer of permanent adhesive material and pressing the exposed permanent layer of adhesive material against the structure. In addition, a variety of indicia, such as coupon and advertising indicia, can be printed on the card.

The invention also includes a preferred method of manufacturing the card. In the preferred method, the blank portion of the card may be ordered and received, the pressure sensitive construction material or label portion may be ordered and received, and the electronic art of images or indicia to be printed on the top surface of the card can be created. Next, film can be made from the electronic art of the images or indicia. Using the film, printing plates can then be made for printing the images or indicia on the card. Next, a press is set up with the printing plates. Next, the blank portion and the label portion are "married together" by pressing the exposed portion of he layer of adhesive material against the blank portion by using the press. After "marrying" the blank portion and the label portion together, the images or indicia are then printed on top or bottom surface of the card. Next, the card is cut to a final size while remaining on the press. Finally, the card is boxed and shipped.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
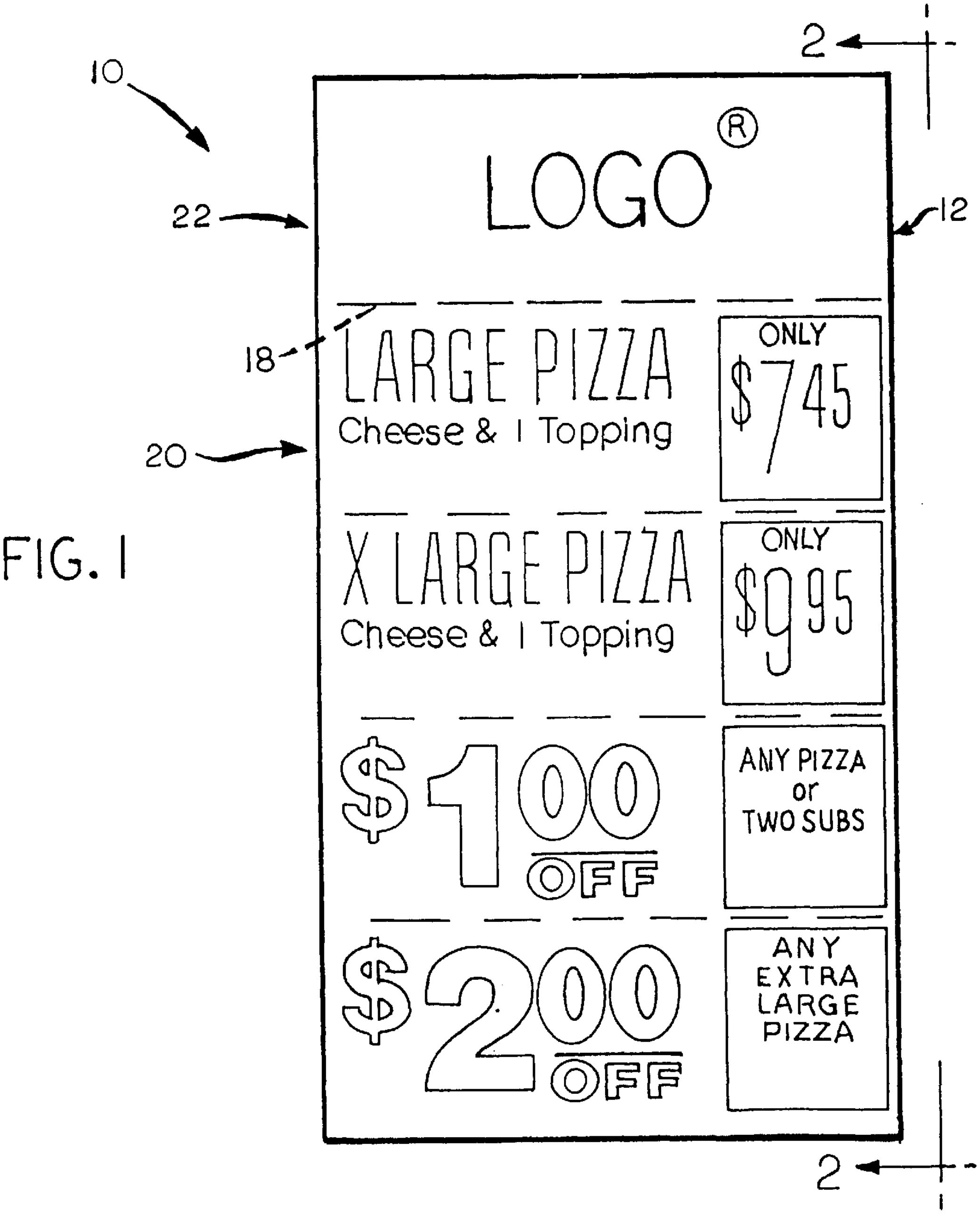
FIG. 1 is a front view of a card according to a first preferred embodiment of the invention.
Figure 2:
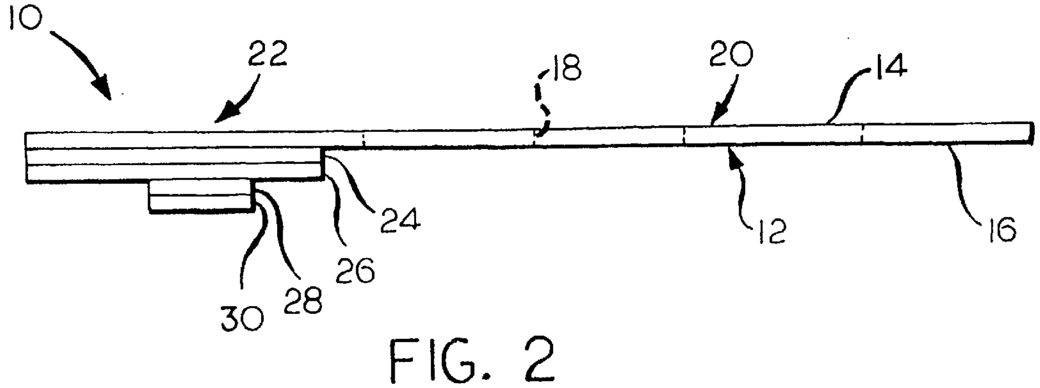
FIG. 2 is a side view of the card taken along line 2—2 of FIG. 1.

Referring now to the drawings, there is illustrated in FIGS. 1 and 2, a card, shown generally at 10, such as an advertising card, according to a first preferred embodiment of the invention. Referring now to FIG. 1, the card 10 is formed of an unsupported coupon portion or blank 12 having an upper or top surface 14 and a lower or bottom surface 16. The blank 12 can be commercially purchased as 7 pt. C1S Semi-Gloss coupon stock from Dunsirn Industries, Neenah, Wis. However, it should be realized that the blank 12 may be made of paper, tag stock, clear film, white film, frosted film and the like, synthetic material, such as TYVEK®, KIMDURA®, VALERON®, and the like. The blank 12 may include a coated, non-coated, corona or non-corona treated surface of a type well known in the art. Preferably, the blank 12 has a thickness in the range of approximately 1 to 25 mils.

The blank 12 may be formed with one or more perforations 18 extending across the width of the blank 12 (as viewed in FIG. 1) to divide the blank 12 into a bottom section 20 and a top section 22. The top surface 14 of the top section 22 can be printed with indicia, such as a business trademark, service mark and the like. Likewise, the top surface 14 of the bottom section 20 can be printed with indicia, such as promotional purchase coupons and the like. To provide a suitable printing surface for the indicia, the second surface 16 of the blank 12 may be a top coated, non-coated, corona or non-corona treated surface, depending on the type of material for the blank 12.

A layer of adhesive material 24 is disposed over one of the surfaces 14 and 16 of the blank 12, for example, over the bottom surface 16 of the top section 22 of the blank 12 for allowing the card 10 to be removably attached to a wide variety of structures, such as walls, doors, windows, appliances, equipment, and the like. Preferably, the layer of adhesive material 24 has an adhesive property such that enough adhesion is produced to removably attach the card 10 to the structure, but does not provide too much adhesion to cause damage to the structure when removed therefrom.

In order for the layer of adhesive material 24 to provide the proper amount of adhesion, the adhesive material used for the layer of adhesive material 24 can be commercially purchased from Fasson Roll North America, Painseville, Ohio as FASSON® UR1 Adhesive and R130 Adhesive. Typical adhesion values (lbs/inch$^2$) for these two adhesives are given below.

TABLE I

Typical Adhesive Values (lbs/inch$^2$) for FASSON ® UR1 Adhesive

| SUBSTRATE Facestock | 24 HOUR PEEL Uncoated Litho | LOOPTACK Uncoated Litho |
|---|---|---|
| STAINLESS STEEL | 0.07–0.13 | 0.30–0.50 |
| HDPE | 0.05–0.12 | 0.13–0.27 |
| GLASS | 0.05–0.09 | 0.20–0.60 |
| POLYSTYRENE | 0.30–0.40 | 0.40–0.70 |
| MANILA | 0.07–0.14 | 0.17–0.34 |

TABLE II

Typical Adhesive Values (lbs/inch$^2$) for FASSON ® R130 Adhesive--

| SUBSTRATE Facestock | 24 HOUR PEEL High Gloss | LOOPTACK High Gloss |
|---|---|---|
| STAINLESS STEEL | 0.4–0.7 | 0.7–1.0 |
| TREATED HDPE | 0.4–0.6 | 0.4–0.9 |
| TREATED LDPE | 0.3–0.6 | 0.3–0.7 |
| POLYPROPYLENE | 0.5–0.8 | 1.1–1.4 |
| GLASS | 0.5–0.8 | 0.5–1.0 |

The layer of adhesive material 24 may be any suitable dimension in order to adequately hold the card 10 in place on the desired structure (not shown). Alternatively, the layer of adhesive material 24 may comprise a static cling layer of a type commercially purchased as FLEXCON® from Flexcon Company, Inc., Spencer, Mass.

A layer of liner material 26 may be disposed over the layer of adhesive material 24. Preferably, the layer of liner material has dimensions that are coextensive with the layer of adhesive material 24 so as to entirely cover the layer of adhesive material 24. The layer of liner material 26 is preferably made of a material that can be easily peeled off from the layer of adhesive material 24 in order to expose the layer of adhesive material 24. Preferably, the layer of liner material 26 has a thickness in the range of 40# to 92#. For example, such a liner can be commercially purchased as FASSON® 50# MF Liner from Fasson Roll North America, Painesville, Ohio. In use, the consumer can peel off the layer of liner material 26 from the layer of adhesive material 24. A score (not shown) may be provided to assist the consumer in peeling off the layer of liner material 26 from the layer of adhesive material 24. Once the layer of liner material 26 is peeled off from the card 10, the consumer may then removably attach the card 10 to any desirable structure, such as walls, doors, windows, appliances, equipment, and the like, by pressing the layer of adhesive material 24 against the structure.

The card 10 may also include a layer of permanent adhesive material 28 disposed over the layer of liner material 26 for fixedly attaching the card 10 to a structure (not shown). The dimensions of the layer of permanent adhesive material 28 may be any suitable dimension in order to fixedly attach the card 10 to a structure (not shown), such as a pizza box and the like. A second layer of liner material 30 may be disposed over the layer of permanent adhesive material 28. Preferably, the dimensions of the second layer of liner material 30 are coextensive with the layer of permanent adhesive material 28 so as to entirely cover the layer of permanent adhesive material 28. The second layer of liner material 30 is preferably made of a similar material as the first layer of liner material 26 so that the second layer of liner material 30 can be easily peeled off from the layer of permanent adhesive material 28. The layer of permanent adhesive material 28 and the second layer of liner material 30 can be commercially purchased as 9920XL or 9925XL adhesive transfer tape from 3M Corporation, St. Paul, Minn.

The card 10 can be fixedly attached to a structure, such as a pizza box, by peeling off the second layer of liner material 30 and pressing the permanent adhesive material 28 against the structure. Once the consumer receives the pizza box, the consumer may easily peel off the blank 12, along with the layer of adhesive material 24, from the layer of liner material 26 that is fixedly attached to the layer of permanent adhesive 28. Then, the consumer may then removably attach the blank 12 of the card 10 to a structure, such as walls, doors, windows, appliances, equipment, and the like.

Figure 3:
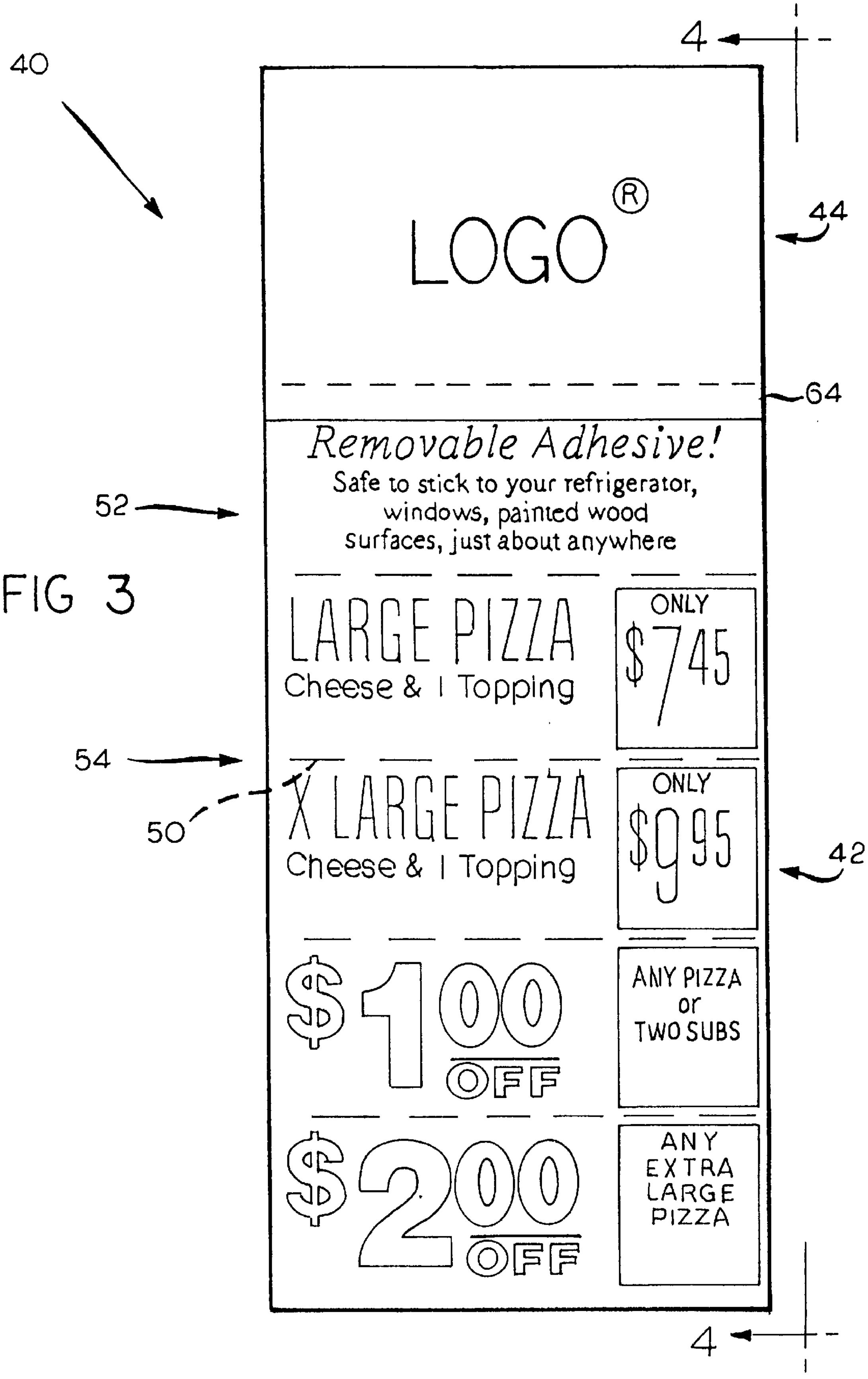
FIG. 3 is a front view of a card according to a second preferred embodiment of the invention.
Figure 4:
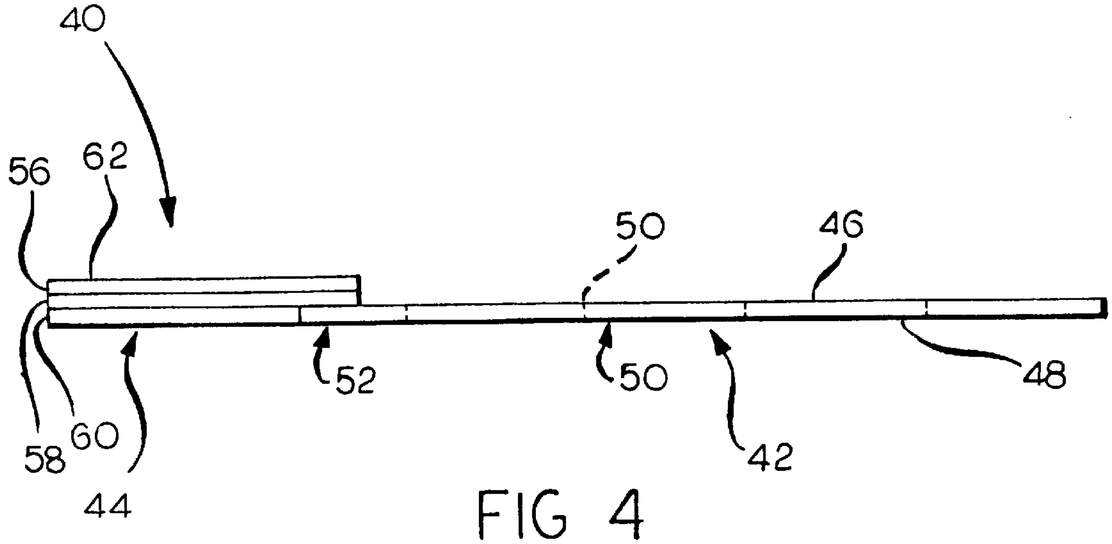
FIG. 4 is a side view of the card taken along line 4—4of FIG. 3.
Figure 5:
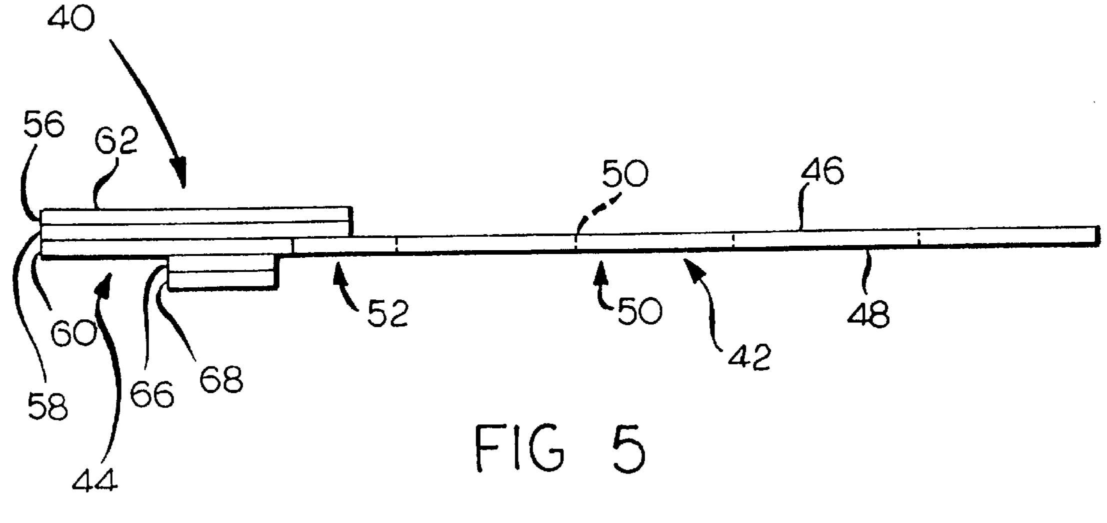
FIG. 5 is another side view of the card taken along line 4—4 of FIG. 3 showing the layer of permanent adhesive and the second layer of liner material.

Referring now to the drawings, there is illustrated in FIGS. 3–5, a card, shown generally at 40, such as an advertising card, according to a second preferred embodiment of the invention. Referring now to FIG. 4, the card 40 is formed of a blank portion 42 and a label portion 44. The blank portion 42 may be identical to the blank 12 of the first preferred embodiment of the invention. Thus, the description of the blank portion 42 is omitted herein for brevity. The blank portion 42 has a upper or top surface 46 and a lower or bottom surface 48. The blank portion 42 may be formed with one or more perforations 50 extending across the width of the blank 42 (as viewed in FIG. 3) to divide the blank portion 42 into a upper or top section 52 and a lower or bottom section 54. The top surface 46 of the bottom section 54 can be printed with indicia, such as promotional purchase coupons and the like. Likewise, the top surface 46 of the top section 52 can be printed with indicia, such as various uses and instructions for the card 40.

Referring now to FIG. 4, the label portion 44 includes a layer of sheet material 56, a layer of adhesive material 58, and a layer of liner material 60. The layer of sheet material 56 can be commercially purchased as FASSON® High Gloss+ from Fasson Roll North America, Painesville, Ohio. However, it should be realized that the layer of sheet material 56 may be made of paper, tag stock, clear film, white film, frosted film and the like, synthetic material, such as TYVEK®, KIMDURA®, VALERON® and the like. The layer of sheet material 56 may include a coated, non-coated, corona or non-corona treated surface of a type well known in the art. The layer of sheet material 56 preferably has a thickness in the range of approximately 1 to 25 mils. The upper surface 62 of the layer of sheet material 56 can be printed with indicia, such as a business trademark, service mark and the like.

The layer of adhesive material 58 is disposed adjacent the layer of sheet material 56. The layer of adhesive material 58 may be identical to the layer of adhesive material 24 of the card 10 of the first preferred embodiment of the invention. Thus, the description of the layer of adhesive material 58 is omitted herein for brevity. In the second preferred embodiment, the dimensions of the layer of adhesive material 58 are coextensive with the layer of sheet material 56.

The layer of liner material 60 is disposed over the layer of adhesive material 58. The layer of liner material 60 may be identical to the layer of liner material 26 of the card 10 of the first preferred embodiment of the invention. Thus, the description of the layer of liner material 60 is omitted herein for brevity. By peeling the layer of liner material 60 from the layer of adhesive material 58, the consumer may removably attach the card 40 to a structure. A score (not shown) may be provided to assist the consumer in peeling off the layer of liner material 60 from the layer of adhesive material 58.

Alternatively, the layer of liner material 60 may be omitted from the card 40. This feature allows the consumer to stack a plurality of the cards 40 together and then easily remove one or more cards 40 from the stack of cards 40 by simply peeling off the desired amount of cards 40 from the stack of cards 40.

In the second preferred embodiment, the dimensions of the layer of liner material 60 are not coextensive with the layer of adhesive material 58. As a result, a portion 64 of the layer of adhesive material 58 is exposed for removably attaching the label portion 44 to the blank portion 42 by "marrying" the exposed portion 64 to the blank portion 42. The consumer can easily remove the label portion 44 from the blank portion 42 by peeling off the label portion 44 from the blank portion 42. The label portion 44 containing the trademark or service mark information can then be removably attached to any desirable surface.

Referring now to FIG. 5, the label portion 44 of the card 40 may also include a layer of permanent adhesive material 66 disposed over and a second layer of liner material 68. The layer of permanent adhesive material 66 and the second layer of liner material 68 of the card 40 of the second preferred embodiment of the invention may be identical to the layer of permanent adhesive material 28 and the second layer of liner material 30 of the card 10 of the first preferred embodiment of the invention. Thus, the discussion of the layer of permanent adhesive material 66 and the second layer of liner material 68 is omitted herein for brevity.

Similar to the first embodiment, the card 40 can be fixedly attached to a structure, such as a pizza box, by peeling off the second layer of liner material 68 and pressing the layer of permanent adhesive material 66 against the structure. Once the consumer receives the pizza box, the consumer may easily peel off the blank portion 42, along with the layer of adhesive material 58, from the layer of liner material 60 that is fixedly attached to the layer of permanent adhesive material 66. Then, the consumer may then removably attach the blank portion 42 of the card 40 to a structure, such as walls, doors, windows, appliances, equipment, and the like, by pressing the layer of adhesive material 58 against the structure.

Figure 6:
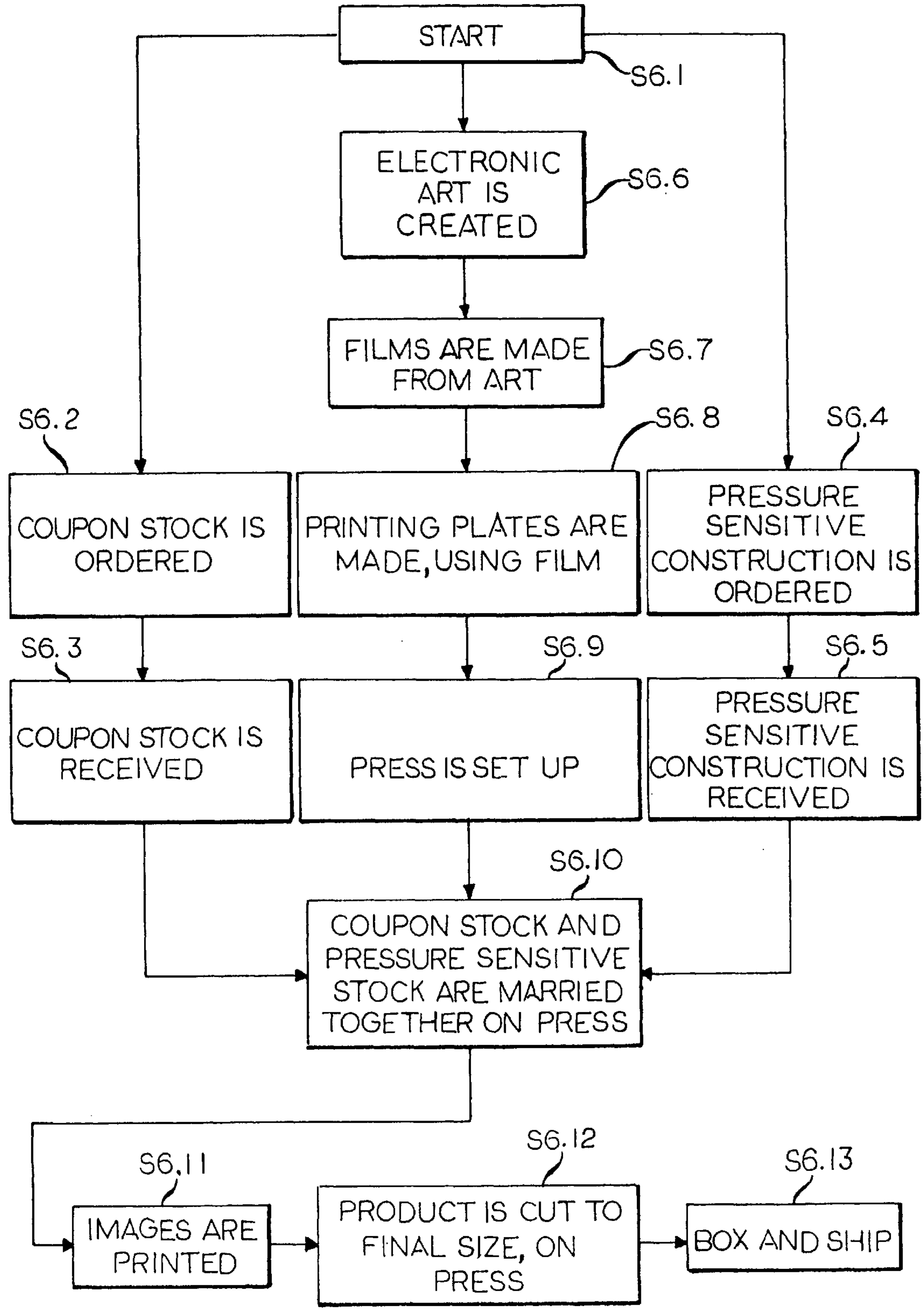
FIG. 6 shows a method of manufacturing the card of the invention.

FIG. 6 shows a preferred method of manufacturing the card 40. The method begins at the start (Step S6.1). From Step S6.1, coupon stock or blank portion 42 may be ordered and received (Steps S6.2 and S6.3). In addition, pressure sensitive construction material or label portion 44 may be ordered and received (Steps S6.4 and S6.5). Further, electronic art of images or indicia to be printed on the top surface 46 of the card 40 can be created using well-known computer techniques (Step S6.6). Next, film can be made from the electronic art of the images or indicia in a manner well known in the art (Step S6.7). Using the film, printing plates can be made for printing the images or indicia on the card 40 (Step S6.8). Next, a press, of a type well known in the art, is set up with the printing plates (Step S6.9). Next, the coupon stock or blank portion 42, along with the pressure sensitive construction or label portion 44 are "married together" by pressing the exposed portion 64 of the layer of adhesive material 58 against the blank portion 42 using the press (Step S6.10). The blank portion 42 and the label portion 44 can be "married together" using a variety of well known techniques, such as, hot melt glue, cold melt glue, double sided tape, transfer tape adhesive, crimping, stapling, heat seal, and the like.

After "marrying" the blank portion 42 and the label portion 44 together, the images or indicia can be printed on the top surface 46 of the card 40 (Step S6.11). The top surface 46 of the card 40 may be printed using a variety of well known printing techniques, such as, flexo, offset, rotogravure, screen printing, letterpress, digital toner, copier, electronic ink jet or laser printing, any "plate-less" process, and the like.

It should be noted that the bottom surface 48 of the card 40 can also be printed with any desirable indicia in a like manner. Next, the card 40 is cut to a final size while remaining on the press (Step S6.12). Alternatively, the top surface 46 of the card 40 may be left blank in Step S6.12 and then printed after the card 40 is cut to it's final size in Step S6.12. Finally, the card 40 is boxed and shipped (Step S6.13).

It should be realized that the card 10 can be manufactured using the same method as described above, except that the coupon stock or blank portion 42 and pressure sensitive construction material or label portion 44 of the card 40 is replaced with a blank 12, thereby eliminating the label portion 44 of the card 40. Thus, the card 10 does not require "marrying" the blank portion 42 with the label portion 44 as is required in the card 40, thereby simplifying the manufacturing process.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A card, comprising:

a blank, said blank having a first surface and a second surface, said blank having at least one line of perforations dividing said blank into a first section and a second section;

a first layer of adhesive material directly contacting at least a portion of said first surface within said second section of said blank, a first layer of liner material directly contacting at least a portion of said first layer of adhesive material;

a second layer of adhesive material directly contacting at least a portion of said first layer of liner material; and a second layer of liner material directly contacting said second layer of adhesive material, wherein removing at least a portion of said first layer of liner material exposes a portion of said first layer of adhesive material, said card being removably attached to a structure by pressing the exposed first layer of adhesive material against the structure, and wherein removing at least a portion of said second layer of liner material exposes a portion of said second layer of adhesive material for fixedly attaching said card to the structure.

2. The card according to claim 1, further comprising indicia printed on at least a portion of the second surface of the first section of said blank.

3. The card according to claim 2, wherein said indicia comprises coupon indicia.

4. The card according to claim 1, further comprising indicia printed on at least a portion of the second surface of the second section of said blank.

5. The card according to claim 1, wherein said first layer of adhesive material has a looptack range of adhesion of 0.20 to 1.00 lbs/inch$^2$ on glass.

6. The card according to claim 1, wherein said first layer of adhesive material has a 24-hour peel range of adhesion of 0.05 to 0.80 lbs/inch$^2$ on glass.

7. The card according to claim 1, wherein said blank has a thickness in a range of 1 to 25 mils.

8. A card, comprising:

a blank portion having a first surface and a second surface; and a label portion, said label portion comprising a layer of sheet material, a layer of adhesive material directly contacting said layer of sheet material, and a layer of liner material directly contacting said layer of adhesive material, said layer of liner material having dimensions that are not coextensive with the dimensions of said layer of adhesive material to define an exposed portion of said layer of adhesive material, wherein said label portion is removably attached to a portion of said blank portion by marrying the exposed portion of said layer of adhesive material to said blank portion.

9. The card according to claim 8, wherein said blank portion includes at least one line of perforations dividing said blank portion into a first section and second section.

10. The card according to claim 9, wherein removing one of said first and second sections from said layer of liner material exposes at least a portion of said layer of adhesive material for removably attaching said card to a structure.

11. The card according to claim 8, further comprising indicia printed on at least one of said first and second surfaces of said blank portion.

12. The card according to claim 8, further comprising indicia printed on at least a portion of said layer of sheet material.

13. The card according to claim 8, further comprising a layer of permanent adhesive material disposed adjacent said layer of liner material.

14. The card according to claim 13, further comprising a layer of removable liner material disposed adjacent said layer of permanent adhesive material, wherein removing at least a portion of said layer of removable liner material exposes at least a portion of said layer of permanent adhesive material to fixedly attach said card to a structure.

15. The card according to claim 8, wherein said layer of adhesive material has a looptack range of adhesion of 0.20 to 1.00 lbs/inch$^2$ on glass.

16. The card according to claim 8, wherein said layer of adhesive material has a 24-hour peel range of adhesion of 0.05 to 0.80 lbs/inch$^2$ on glass.

17. The card according to claim 8, wherein said blank portion has a thickness in a range of 1 to 25 mils.

18. The card according to claim 8, wherein said label portion has a thickness in a range of 1 to 25 mils.

19. A card, comprising:

a blank having a first surface and a second surface, said blank having at least one line of perforations dividing said blank into a first section and a second section;

a first layer of adhesive material directly contacting at least a portion of said first surface within said second section of said blank, said first layer of adhesive material has a looptack range of adhesion of 0.20 to 1.00 lbs/inch$^2$ on glass; and a first layer of liner material directly contacting at least a portion of said first layer of adhesive material;

wherein removing at least a portion of said first layer of liner material exposes a portion of said first layer of adhesive material for removably attaching said card to a structure by pressing the exposed first layer of adhesive material against the structure.

20. The card according to claim 19, further comprising a second layer of adhesive material directly contacting said first layer of liner material.

21. The card according to claim 20, further comprising a second layer of liner material directly contacting said second layer of adhesive material, wherein removing at least a portion of said second layer of liner material exposes at least a portion of said second layer of adhesive material for fixedly attaching said card to the structure.

22. The card according to claim 19, wherein said first layer of adhesive material has a 24-hour peel range of adhesion of 0.05 to 0.80 lbs/inch$^2$ on glass.

23. The card according to claim 19, wherein said blank has a thickness in a range af 1 to 25 mils.

24. The card according to claim 19, wherein said first layer of adhesive material has a looptack range of adhesion of 0.20 to 1.00 lbs/inch$^2$ on glass.

* * * * *

UNITED STATES PATENT AND TRADEMARK OFFICE
CERTIFICATE OF CORRECTION

PATENT NO. : 6,228,451 B1
DATED : May 8, 2001
INVENTOR(S) : Randall A. Boudouris and Robert E. Napierala, II It is certified that error appears in the above-identified patent and that said Letters Patent is hereby corrected as shown below:

Column 7,
After Claim 4, insert the following:
-- 5. The card according to Claim 4, wherein said indicia comprises advertising indicia. --.

Signed and Sealed this

Twentieth Day of November, 2001

*Attest:*

Nicholas P. Godici

NICHOLAS P. GODICI

*Attesting Officer* *Acting Director of the United States Patent and Trademark Office*